United States Patent [19]

Hashimoto et al.

[11] Patent Number: 4,763,037
[45] Date of Patent: Aug. 9, 1988

[54] FLAT MOTOR HAVING A STATIONARY MAGNET

[75] Inventors: Nobuyuki Hashimoto, Toyota; Hiroyuki Amano, Kariya; Katsumasa Shimizu, Toyoake, all of Japan

[73] Assignee: Aisin Seiki Kabushiki Kaisha, Aichi, Japan

[21] Appl. No.: 15,471

[22] Filed: Feb. 17, 1987

[30] Foreign Application Priority Data

| Feb. 15, 1986 | [JP] | Japan | 61-031704 |
| Feb. 15, 1986 | [JP] | Japan | 61-031705 |
| Feb. 15, 1986 | [JP] | Japan | 61-031706 |
| Feb. 15, 1986 | [JP] | Japan | 61-031707 |

[51] Int. Cl.$^4$ ................... H02K 23/54; H02K 15/12; H02K 9/22
[52] U.S. Cl. ................... 310/268; 310/64; 310/67 R
[58] Field of Search ............ 310/67 R, 154, 268, 310/68, 64

[56] References Cited

U.S. PATENT DOCUMENTS

| 3,899,702 | 8/1975 | Hanna et al. | 310/67 |
| 3,922,574 | 11/1975 | Whiteley | 310/268 |
| 4,283,644 | 8/1981 | Kondo et al. | 310/68 R |
| 4,360,751 | 11/1982 | Arnold, Jr. et al. | 310/268 |
| 4,517,480 | 5/1985 | Müller | 310/268 |
| 4,566,864 | 1/1986 | Yamamoto | 310/268 |
| 4,658,162 | 4/1987 | Koyama et al. | 310/268 |

FOREIGN PATENT DOCUMENTS 170686 10/1982 Japan .
190264 11/1983 Japan .

Primary Examiner—Patrick R. Salce
Assistant Examiner—D. L. Rebsch
Attorney, Agent, or Firm—Sughrue, Mion, Zinn, Macpeak & Seas

[57] ABSTRACT

A flat motor suitable for driving the fan of an internal combustion engine includes a stationary cover member in the form of a disk adapted to be fixedly secured to a stationary support and a shaft secured at one end to the center of the cover member. A permanent magnet ring is secured to the cover member about the shaft and a rotor of synthetic resin material having an electric coil embedded therein is rotatably mounted on a shaft by means of a ball bearing which supports the entire weight of the shaft. A commutator ring assembly is secured to one side of the rotor and a bearing sleeve is mounted between the commutator ring and the shaft. A yoke is provided on the opposite side of the electrical coil from the permanent magnet and may be comprised of a plurality of disks of magnetic material secured in the resin material. A disk of soft magnetic material having a fan assembly integrally molded about the outer periphery thereof is secured to the rotor in engagement with the disk comprising the yoke. The disk could be eliminated and the fan supporting disk could be disposed in contact with the rotor adjacent the electric coil to act as the yoke.

10 Claims, 4 Drawing Sheets

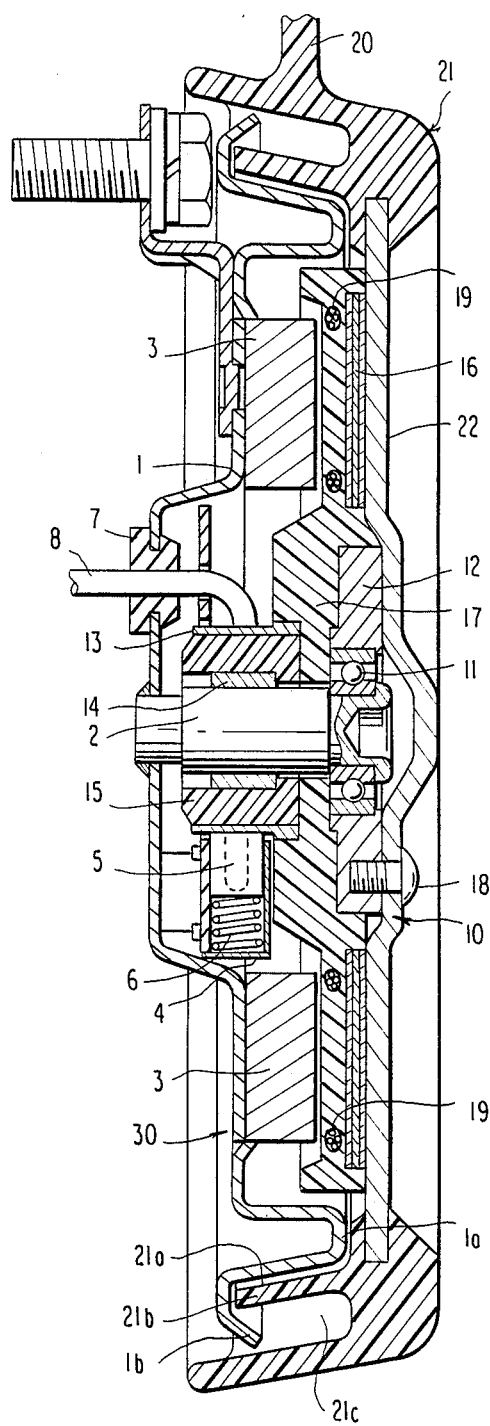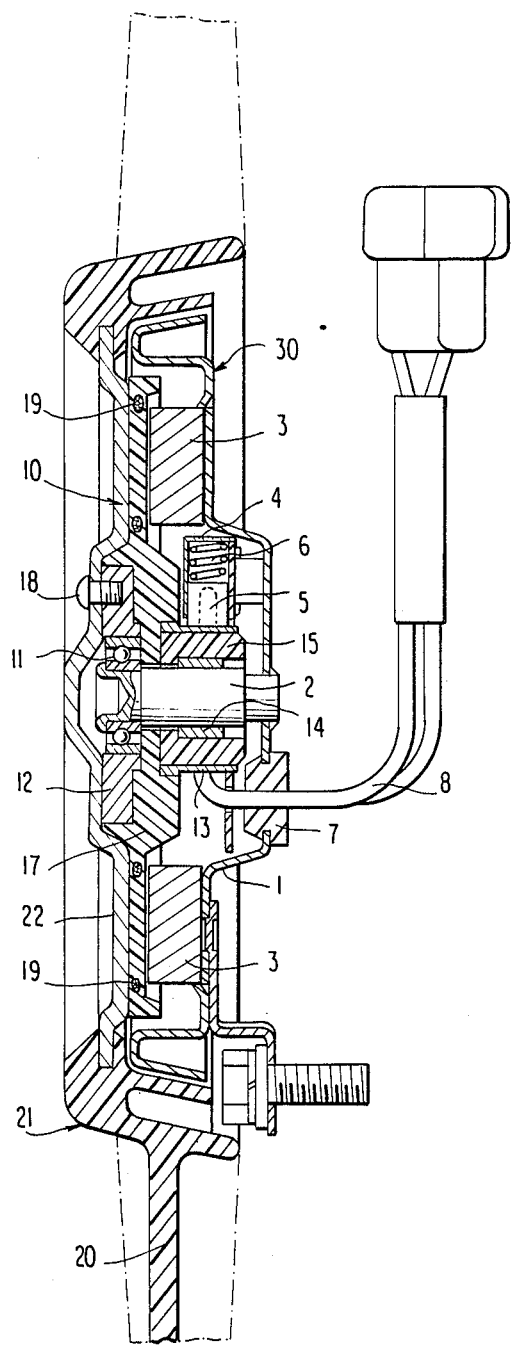

FLAT MOTOR HAVING A STATIONARY MAGNET

BACKGROUND OF THE INVENTION

The present invention is directed to a flat motor wherein the axial thickness is minimized, and more particularly to a flat motor which is suitable for use as a fan motor such as used for the radiator fan of a motor vehicle.

The thickness of the various components of a flat motor, such as an armature or field magnet, are necessarily limited when it is desired to reduce the axial thickness of a flat motor. Therefore the magnetic field between the armature and the field magnet will be weakened accordingly.

If the magnetic field between the armature and the field magnet is weak, the output torque will also be weak and the characteristics of such a flat motor will become undesirable. Therefore it is desirable in a flat motor that the magnetic field intensity between the armature and the field magnet be maintained so that the output torque will be efficiently transmitted.

Two methods are available for increasing the magnetic field intensity between the armature and the field magnet. One involves increasing the magnetic flux generated by the field magnet and the other involves the increasing of the magnetic flux generated by the armature.

Increasing the magnetic flux of the armature is not suitable for a flat motor wherein a permanent magnet is used as the field magnet. The maximum field intensity of the permanent magnet is determined by the ferromagnetic materials of the permanent magnet and a strong permanent magnet is usually too big, too heavy, or too expensive. Thus it is more feasible to increase the flux generated by the armature in a flat motor.

Two ways of increasing the flux generated by the armature are increasing the exciting current through the armature and efficiently utilizing the flux generated by the armature. However a big increase in the exciting current will raise the temperature of the armature and deteriorate the reliability of the flat motor. Thus in order to increase the magnetic field intensity between the armature and the field magnet it is most desirable to efficiently utilize the flux generated by the armature.

Many methods of utilizing the flux generated by the armature have been suggested. For example, Japanese laid open patent Application No. 170686/82 discloses a motor which utilizes the flux by fixing the yoke to the armature directly. Japanese laid open patent Application No. 170686/82 also discloses a motor which utilizes the flux by fixing the armature coil to the ferromagnetic member and by fixing the field magnet to the soft magnetic member. However when the rotational speed of a conventional flat motor increases, the temperature of the motor rises, since the rotor generates an eddy current loss.

Reducing the frictional loss between the rotor and the stator is preferable for a flat motor, so as to efficiently transmit the torque generated between the armature and the field magnet. It is also preferable to prevent water droplets, dust or the like from entering into the flat motor.

Japanese laid open patent Application No. 190264/83 and Japanese laid open patent Application No. 170686/82 disclose a motor which includes two bearings provided at opposite ends of the output shaft in order to reduce the friction loss. They also disclose a motor which includes a seal provided between the rotor and the stator. However in this conventional flat motor the thickness is increased because two coaxial bearings are provided at opposite ends of the rotating shaft. Furthermore in a conventional flat motor the temperature of the armature rises because a seal prevents the heat from being radiated to the atmosphere.

SUMMARY OF THE INVENTION

The present invention provides a new and improved flat motor assembly which obviates the above mentioned drawbacks associated with conventional flat motors.

The present invention provides a new and improved flat motor assembly wherein the eddy current loss is reduced in order to obtain a high degree of efficiency.

The present invention provides a new and improved flat motor assembly which radiates the heat of the rotor to the atmosphere in order to obtain a high degree of reliability.

The present invention provides a new and improved flat motor assembly wherein the frictional loss is reduced between the rotor and the stator in order to attain a high degree of efficiency. The degree of precision in such a flat motor assembly enables the backlash between the rotor and the stator to be minimized.

The present invention provides a new and improved flat motor assembly having an improved sealing arrangement between the rotor and the stator to prevent the entry of water and dust into the flat motor assembly.

The present invention provides a new and improved flat motor assembly including cover means for accommodating all of the constituents of the motor, a stator comprised of a permanent magnet and a shaft, a rotor comprised of an electrical coil, a yoke and coupling means and a sealing member which is provided between the stator and the rotor.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a cross sectional view of a flat motor according to a first embodiment of the present invention.

FIG. 2 is a cross sectional view of a flat motor according to the a second embodiment of the present invention.

DETAILED DESCRIPTION OF THE INVENTION

Figure 3:
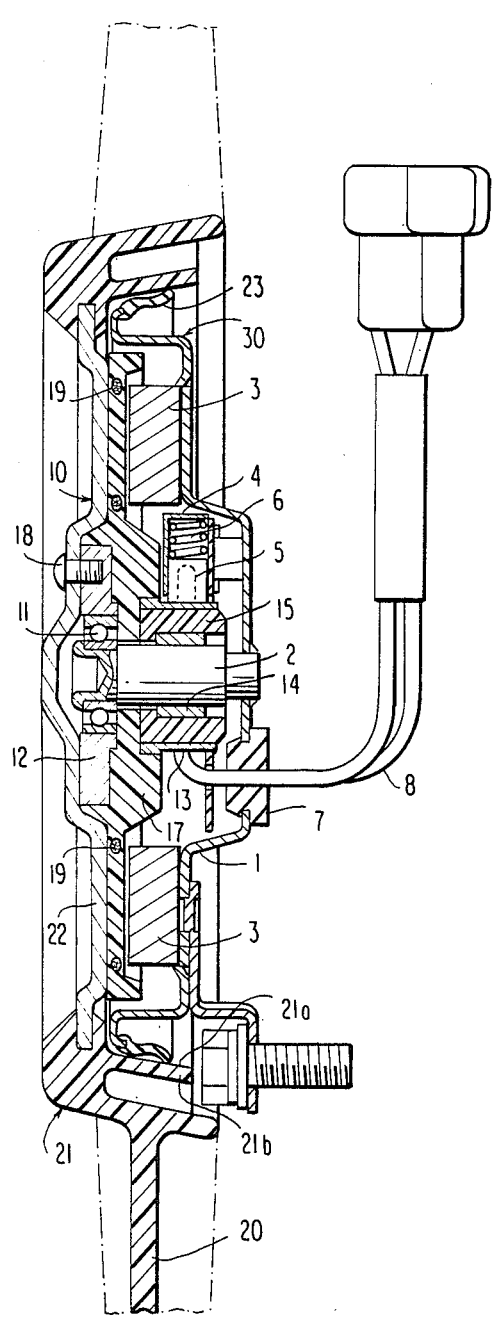
FIG. 3 is a cross sectional view of a flat motor according to a third embodiment of the present invention.

Referring now to FIG. 1, a cover 1 is made from a thin plate, such as an iron plate and is formed as a low profile element. A shaft 2 is rigidly secured to the center of the cover 1 by a suitable connecting means such as welding and the like. A cylindrical permanent magnet 3 is secured to the cover 1 coaxially with the shaft 2. The inner race of a ball bearing 11 is secured to the shaft 2 by crimping one end of the shaft 2. The outer race of the ball bearing 11 is press fitted into a support member 12 whereby the support member 12 will be rotatably mounted relative to the cover 1 and the shaft 2. A base member 17, made of synthetic resins, is secured to the support member 12. An electric coil 19 is molded into the base member 17. A fan boss 22 is secured to the support member 12 by means of screws 18. A fan 20, which may also be made of synthetic resins, is provided with a fan base 21 which is integrally molded on the fan boss 22. A base member 17 of synthetic resins is supported at one side on the support member 12 and includes an electrical coil 19 integrally molded therein. A yoke 16 comprising a plurality of thin ferromagnetic disk plates is held between the base member 17 and boss 22.

A commutator 15 is rotatably mounted on the shaft 2 by means of an annular metal bearing 14 and supports the base member 17 on the opposite side thereof from the support member 12. Thus the base member 17 is rotatably mounted on the shaft without any backlash. A commutator segment 13 is formed on the outer circumference of the commutator 15 and is electrically connected to the coil 19. A brush 5 is slidably disposed within a brush support housing 4 which is mounted on the cover 1. The brush 5 is biased into engagement with the commutator segment 13 by means of a spring 6 disposed in the brush support housing 4. The brush 5 is electrically connected to a conductor wire which extends through a rubber sleeve mounted in an aperture in the cover 1. Thus electrical power is provided to the coil 19 through the conductive wire 8, the brush 5 and the commutator segment 13.

The permanent magnet 3 and the yoke 16 are disposed on opposite sides of the base member 17 with a small air gap formed between the permanent magnet 3 and the base member 17. The yoke 16 is molded directly into the base member 17 and is made from a plurality of silicon steel disks.

In order to protect the components of the electric motor, especially the commutator and brush assemblies, from dirt and water, the outer circumferences of the fan and cover are intermeshed with each other to define a sealing arrangement. The outer periphery of the fan base is provided with a first laterally extending projection, having the fan 20 protruding therefrom and a second laterally extending projection 21b spaced radially inwardly therefrom to define a groove 21c. The outer periphery of the cover 1 is formed with a first reversely bent portion 1a which is interposed between the outer circumference of the base member 17 and the inner surface 21a of the projection 21b on the fan base. The outer circumference of the cover 1 is also provided with a second reversely bent portion 1b which extends about the projection 21b on the fan base, thereby defining a labyrinth type seal which will prevent the entry of water and dirt to the interior of the flat water assembly.

The stator 30 comprises a permanent magnet 3, the brush support housing 4, the brush 5, and the cover 1. The rotor 10 comprises the commutator 15 having segment 13 thereon, the support member 12, the base member 17 and the yoke 60. The fan 20 comprises a fan base 21 and the fan boss 22.

The rotor 10 is rotated by the magnetic effect of the electric coil 19 and the permanent magnet 3 when electric power is supplied through the conductor wire 8, brush 5, and commutator segment 13 to the electrical coil 19. The flat motor includes a magnetic flux path which includes a permanent magnet 3, the radially outer portion of the coil 19, the yoke 16, and the radially inner portion of the coil 19. There is no air gap in the magnetic path between the electrical coil 19 and the yoke 16, and only a small gap is provided between the permanent magnet 3 and the electrical coil 19. Thus the flat motor assembly according to this embodiment is capable of efficiently utilizing the magnetic flux and is capable of efficiently generating a high torque.

It is possible to accurately adjust the length of the air gap since the flat motor according to this embodiment is only provided with an air gap on one side of the rotor 10. Therefore it is possible according to this embodiment to produce a flat motor having average characteristics. The eddy current loss is also reduced in this embodiment so that the yoke 16 is made with a plurality of soft magnetic disk plates having insulation therebetween.

Also, according to the embodiment of FIG. 1, the permeability of the rotor 10 is large since the fan boss 22 may be made of a soft magnetic material. Accordingly the magnetic flux through the electrical coil 19 is increased. The eddy current loss can be reduced by making a fan boss 22 from a plurality of disk plates similar to the yoke 16.

The labyrinth type seal between the outer periphery of the cover 1 and the fan base 21 eliminates the need for additional sealing or closing members. It is possible to eliminate the support member 12 by having the base member 17 and the fan base 21 of integral one piece molded construction.

Referring now to the embodiment of FIG. 2 the same reference numerals have been used for designating members which are identical to those in the embodiment of FIG. 1. In FIG. 2 the yoke 16, which was incorporated in the construction of FIG. 1 has been omitted and the magnetic path is generated through the fan boss 22 instead of the yoke 16.

The electrical coil 19 is molded in the base member 17 and a small air gap is provided between the permanent magnet and the portion of the base member 17 containing the electrical coil 19. The fan boss 22, which is made of soft magnetic material is disposed in engagement with the base member 17 and is secured to the support member 12 by means of screws 18. Since the rotor 10 in the embodiments of FIGS. 1 and 2 is not secured to a shaft which must be supported for rotation by means of bearings at opposite ends, but is mounted for rotation relative to a stationary shaft, it is possible to omit one bearing assembly thereby producing a lower profile motor. In the embodiments of FIGS. 1 and 2 the metal bearing 14 only supports a load which is generated by the unbalance of the rotor 10 since the weight of the rotor 10 is supported by the ball bearing 11. Therefore it is possible to minimize the thickness of the rotor 10 and thereby minimize any unbalancing of the rotor 10 so that the load supported by the metal bearing ring 14 can be decreased. Accordingly the thickness of the metal bearing 14 can be reduced.

In the embodiment of FIG. 2 the base member 17 having an electrical coil molded directly therein, is disposed in direct contact with the fan boss 22. The opposite surface of the fan boss 22 is disposed in contact with the atmosphere so that the heat of the rotor 10, which is generated by the electrical coil 19, is radiated through the fan boss 22 to the atmosphere. Thus the flat motor according to this embodiment is capable of increasing the exciting current so as to enhance the output torque.

The embodiment of FIG. 3 is similar to the embodiment of FIG. 1 except that the yoke 16 has been omitted similar to the manner of FIG. 2 and the second reversely bent portion 1b of the cover 1 has also been omitted. A rubber ring 23 is fixed to the outer circumferential end of the cover 1 by means of an adhesive. The free end of the rubber ring 23 is biased by the inherent resiliency of the rubber ring 23 into engagement with the inner surface 21a of the projection 21b on the fan boss 21. Therefore the entry of water or dust or the like into the motor assembly is prevented by the rubber ring 23.

Figure 4:
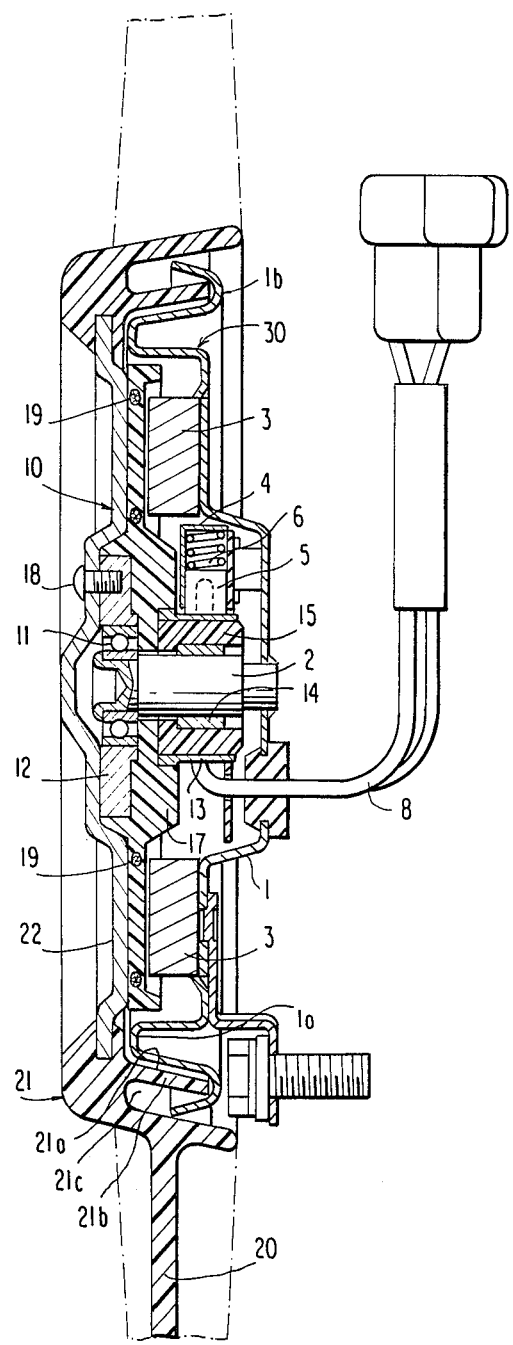
FIG. 4 is a cross sectional view of a flat motor according to a fourth embodiment of the present invention.

In the embodiment of FIG. 4 the yoke 16 has also been omitted and the magnetic path is generated through the fan boss 22 instead of the yoke 16. Otherwise the embodiment of FIG. 4 is substantially identical to the embodiment of FIG. 1.

In the embodiment of FIGS. 5-8, the permanent magnet 3, the brush supporter 4 and the brush 5 are constitute the stator 30; and the commutator 15, commutator, commutator signal 13, base member 17, and the yoke 16 constitute the rotor 10. The fan base 21 and the fan boss 22 constitute the fan 20.

The cover 1 is made from an iron plate and the shaft 2 is rigidly secured at the center of the cover by means of welding or the like. The ring-shaped permanent magnet 3 is also fixed to the cover coaxially with the shaft 2. A ball bearing 11 is secured on the end of the shaft by means of a C-shaped clip 25. The support member 12 is pressed onto the ball bearing 11 for rotation relative to the shaft 2 which is fixed to the cover 1. The base member 17 is integrally molded on the support member 12. The electrical coil 19 and the yoke 16 are molded in the base member 17. The fan boss 22 is secured to the support member 12 outwardly of the yoke by means of screws 18. The fan base 21 is secured to the fan boss 22 by means of rivets 24. The yoke 16, which comprises a plurality of soft magnetic disk plates, is pinched between the base member 17 and the support 12. The commutator 15 is secured to the base member 17, and the electrical coil 19 is connected to the commutator segments 15 which receive current from the brush 5.

Figure 5:
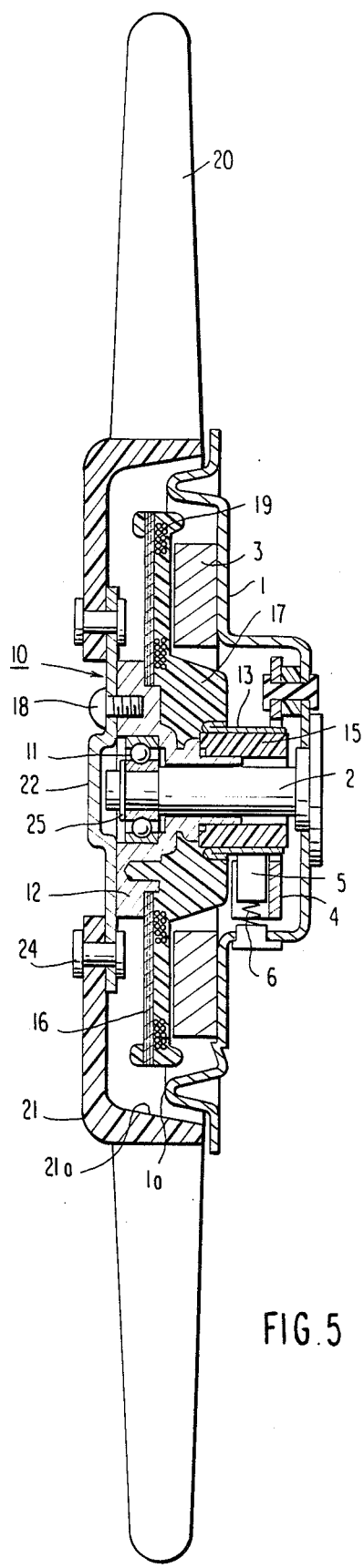
FIG. 5 is a cross sectional view of a flat motor according to a fifth embodiment of the present invention.
Figure 6:
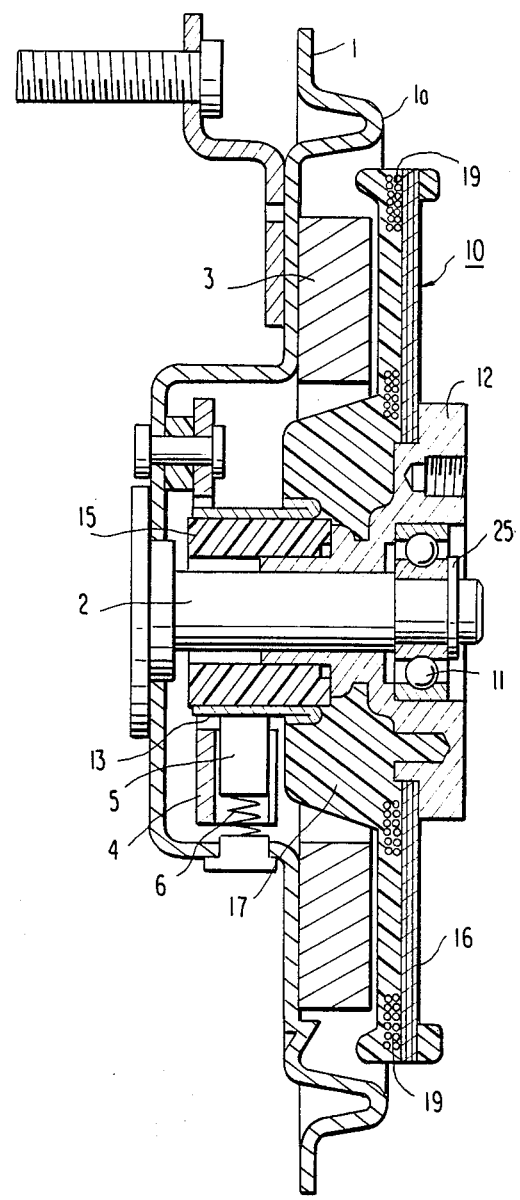
FIG. 6 is a cross sectional view of the flat motor of FIG. 5 without the fan.
Figure 7:
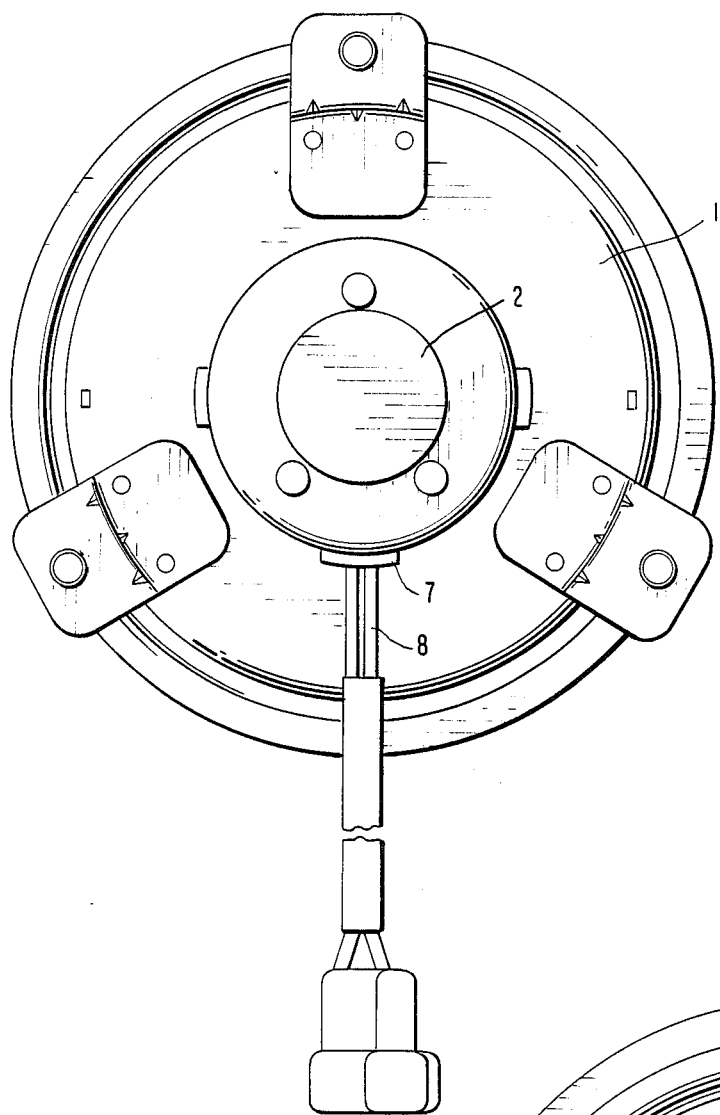
FIG. 7 is a left side view of the flat motor as viewed in FIG. 6.
Figure 8:
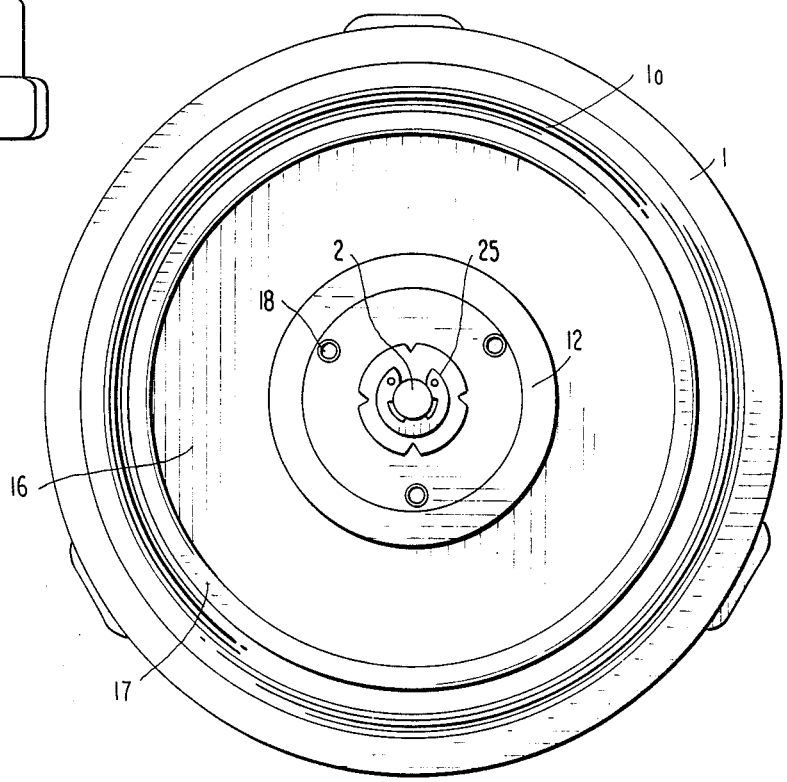
FIG. 8 is a right side view of the flat motor as viewed in FIG. 6.

The sealing construction in FIG. 5 is modified inasmuch as only a single reversely bent portion 1a is provided on the outer periphery of the cover 1, which is disposed in close proximity to the single flange of the fan base 21 to provide a seal.

While the invention has been particularly shown and described with reference to preferred embodiments thereof it will be understood by those in the art that the foregoing and other changes in form and details may be made therein without departing from the spirit and scope of the invention.

What is claimed is:

1. A flat axial aircap electric motor comprising disk-shaped cover means adapted to be secured to a stationary support, a shaft fixedly secured at one end thereof to said cover means, a ring-shaped permanent magnet secured to said cover means about said shaft, a rotor comprising an electrical coil and yoke means for providing a magnetic flux circuit rotatably mounted on said shaft with a small gap between said permanent magnet and said electrical coil, and heat dissipating means secured to said rotor in heat conducting relation to said yoke means for dissipating heat from said coil to the atmosphere.

2. A flat electric motor as set forth in claim 1 further comprising commutator ring means rotatably mounted on said shaft, brush means mounted on said cover means in engagement with said commutator ring means, first bearing means between said rotor and said shaft for supporting the force generated by the weight of said rotor and second bearing means between said commutator ring means and said shaft for supporting the load generated by the unbalance in said rotor.

3. A flat electric motor as set forth in claim 2 wherein said first and second bearing means are spaced apart on said shaft by a fixed distance.

4. A flat electric motor as set forth in claim 1 further comprises sealing means disposed between said rotor and said stator outwardly of said coil and said magnet.

5. A flat electric motor as set forth in claim 4 wherein said sealing means comprises a rubber ring secured to one of said stator and rotor and disposed in sliding engagement with the other of said stator and rotor.

6. A flat electric motor as set forth in claim 4 wherein said sealing means comprises first projection means on said cover means and second projection means on said rotor complementary to said first projection means for defining a non-contact labyrinth-type seal.

7. A flat electric motor as set forth in claim 1 wherein said electric coil is encapsulated in and supported by a base member of synthetic resin material and said yoke comprises a plurality of disks of magnetic material secured to said base member on the opposite side of said coil from said permanent magnet.

8. A flat electric motor as set forth in claim 1 wherein said electric coil is encapsulated in and supported by a base member of synthetic resin material and said yoke comprises a disk of soft magnetic material adapted to support a fan secured to said base member in overlying engagement with that portion of the base member containing said electric coil.

9. A flat motor as set forth in claim 1, wherein said heat dissipating means includes a support member mounted for rotation on said shaft in contact with said yoke means and a fan boss secured to said support member and adapted to have a fan secured thereto with said yoke means being exposed to the atmosphere.

10. A flat motor as set forth in claim 1, wherein said heat dissipating means comprises a support member mounted for rotation on said shaft and a fan boss adapted to have a fan secured thereto disposed in contact with said yoke means and secured to said support member.

* * * * *